April 13, 1937. O. A. NETSCHKE 2,076,960
MECHANICAL MOVEMENT
Filed Jan. 6, 1936
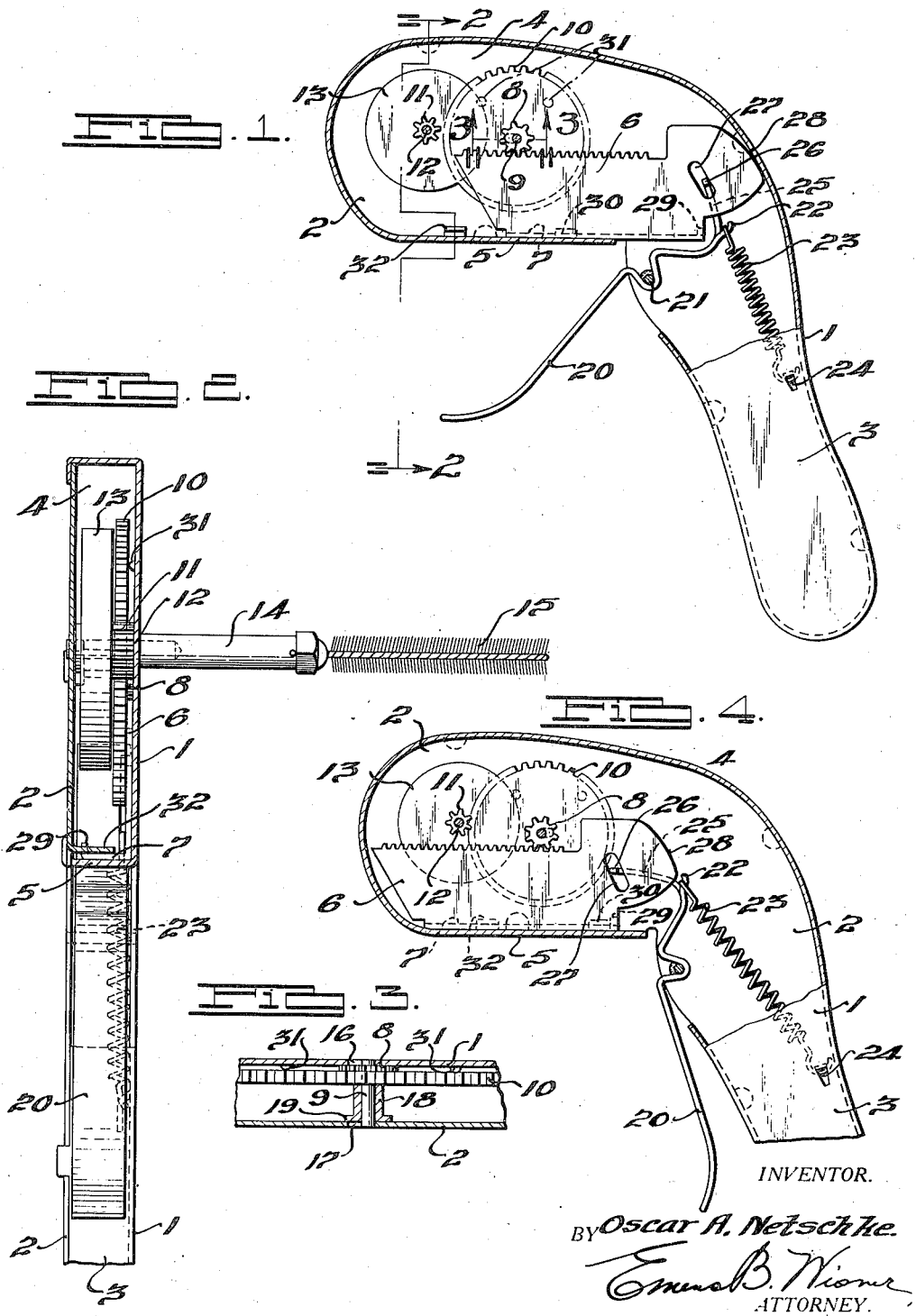
INVENTOR.
BY Oscar A. Netschke.
Emma B. Wiener
ATTORNEY.

Patented Apr. 13, 1937

2,076,960

UNITED STATES PATENT OFFICE 2,076,960

MECHANICAL MOVEMENT

Oscar A. Netschke, St. Clair Shores, Mich.

Application January 6, 1936, Serial No. 57,647

3 Claims. (Cl. 74—130)

This invention relates to rotary tooth brushes and the object of the invention is to provide a rotary tooth brush in which the mechanism for rotating the brush is contained within a sheet metal handle and operated by means of a trigger.

A further object of the invention is to provide a gear mechanism for rotating the brush in which the gear mechanism is operated by a sliding rack, the sliding rack being guided within the casing in its longitudinal movement in either direction and the trigger being arranged to produce the driving movement of the rack while a spring is provided for returning the trigger and rack to the starting position prior to the next driving movement.

Another object of the invention is to provide a rack arranged to engage the wall of the handle member at one end of its stroke and provided with a lug engaging a lug on the handle to form a stop at the other end of its stroke.

A further object of the invention is to provide a rack having a flange riding in sliding engagement with one wall of the handle member and the handle member being provided with depending lugs spaced from the said wall so that the flange of the rack rides between the depending lugs and the wall of the handle member.

Another object of the invention is to provide a longitudinally slidable rack provided with an angular slot in one end and a pivoted trigger having a lug engaging in said slot whereby turning movement of the trigger in one direction of its pivot moves the rack longitudinally in one direction and turning movement of the trigger in the opposite direction moves the rack in the opposite direction and a spring tending to turn the trigger to move the rack in one direction only.

These objects and the several novel features of the invention are hereinafter more fully described and claimed and the preferred form of construction by which these objects are attained is shown in the accompanying drawing in which—

Fig. 1 is a section through a rotary tooth brush embodying my invention.

Fig. 2 is an enlarged section taken on line 2—2 of Fig. 1.

Fig. 3 is an enlarged section taken on line 3—3 of Fig. 1.

Fig. 4 is a section similar to Fig. 1 showing the rack at the end of its driving movement.

The device comprises a sheet metal casing 1 which is provided with a cover member 2 secured thereto. The casing is formed to provide a handle portion 3 and a larger portion 4 for the mechanism. Within the portion 4 of the casing and riding against the straight flange 5 is a rack 6 having a flange 7 which rides against the flange 5 as shown in Figs. 1 and 2. This rack 6 meshes with a small gear 8 which is secured to the shaft 9 and a large gear 10 is also secured to the shaft and adapted to be moved into mesh with a small gear 11 on the drive shaft 12 and a flywheel 13 is also secured to this shaft 12 as shown in Figs. 1, 2, and 4. The shaft 12 extends through the wall of the casing 1 and a fitting 14 is pressed onto the extending end of the shaft 12 and carries a brush 15 as shown in Fig. 2. One end of the shaft 9 extends into a slot 16 in the casing 1 as shown in Fig. 3 and the other end of the shaft 9 extends into a slot 17 in the cover 2. A sleeve 18 is fitted over the shaft 9 between the gear 10 and the cover of the casing. This sleeve 18 is provided with a flange 19 acting as a guide for the shaft and preventing the shaft from tilting in the casing as it is moved in the slots 16 and 17 by the rack 6.

The small gear 8 also rides on the inner face of the casing and prevents the shaft 9 from tilting in the casing. As will be noted from Figs. 2 and 3, the small gear 8 is of about the same thickness as the rack 6 and thus the large gear 10 may ride on the surface of the rack 6 and on the two bosses 31 pressed inwardly from the bottom of the casing 1 as shown in Fig. 3. These two bosses and the rack 6 provide a support for the gear 10 and prevent tilting of the gear 10 and shaft 9 when moved by the rack. The position of these bosses 31 is indicated in dotted lines in relation to the rack 6 and gear 10 in Fig. 1. A trigger 20 is provided for operating the device and is secured about a pivot pin 21 which is rotatably mounted in the housing 1 and cover 2 and this trigger is provided with a struck out lug 22 to which a spring 23 is connected and the opposite end of the spring is hooked over a lug 24 struck inwardly from the bottom of the casing 1 in the handle portion 3. The curved end 25 of the trigger is provided with an extending lug 26 riding in an angular slot 27 in the rack 6.

Under normal action by the spring 23 the trigger 20 is turned to the position shown in Fig. 1 and by means of the lug 26 riding in the slot 27 the rack is moved so that the curved end 28 thereof engages the wall of the casing as shown in Fig. 1. This movement of the rack 6 moves the gears 8 and 10 and shaft 9 to the right of Fig. 1 and thus moves the shaft 9 to the ends of the slots 16 and 17 and moves the gear 10 out of mesh with the drive gear 11.

At this time by pulling on the trigger 20 the rack is moved to the left of Fig. 1 thus moving the shaft 9 and gears 8 and 10 to the left of Fig. 1 so that the gear 10 is moved into mesh with the gear 11 upon initial movement of the rack 6. Continued movement of the rack 6 rotates the gears 8 and 10 and the gear 10 rotates the gear 11 and flywheel 13 and also rotates the brush 15. The position of the parts at the end of this drive stroke is shown in Fig. 4 in which position the lug 29 on the flange 7 of the rack shown more particularly in Figs. 2 and 4 has moved into engagement with the depending lug 30 struck downwardly from the casing cover 2. A second lug 32 is also struck downwardly from this casing cover as shown in Fig. 4 and the flange 7 of the rack 6 fits between the straight wall 5 of the casing and the inturned lugs 30 and 32 of the cover which act as guides for the rack and allow the rack to be moved longitudinally in either direction. At the end of the driving movement, the trigger 20 is in the position shown in Fig. 4 and upon release of the trigger the spring 23 will turn the trigger back to the position shown in Fig. 1 and will also move the rack to the right thus moving the shaft 9 to the right and moving the gear 10 out of mesh with the gear 11 so that the parts return to the position shown in Fig. 1 ready for the next driving movement. The device is held in the hand by holding the handle 3 in the palm of the hand and engaging one of the fingers over the trigger 20 and inserting the brush 15 in the mouth. In use, the device is operated by a series of strokes of the trigger 20 and the flywheel 13 is utilized to maintain the brush in rotation between the drive strokes.

From the foregoing description it becomes evident that the device is very simple and efficient in operation, will not easily get out of order, may be operated entirely with one hand and provides a device which accomplishes the objects described.

Having thus fully described my invention, its utility and mode of operation, what I claim and desire to secure by Letters Patent of the United States is—

1. In a rotary tooth brush, a housing having a flat wall portion, a toothed rack having a flange riding on said flat wall portion, a cover for the housing provided with depending lugs extending downwardly on the side of the rack flange opposite the flat wall portion, the flange of the rack being guided between said lugs and said flat wall portion, a pinion gear meshing with the toothed rack, a larger gear secured to rotate with the pinion gear, the rack being provided with an angular slot adjacent one end, a trigger pivotally mounted in the housing and having an end engaging in said slot, the arrangement being such that by turning movement of the trigger on its pivot the rack may be moved longitudinally in either direction in the housing, a shaft rotatably mounted in the housing and having an end extending from the housing, a flywheel and gear on the shaft, said gear meshing with the aforesaid large gear and a spring mounted in the housing handle and arranged to turn the trigger in one direction on its pivot.

2. In a rotary tooth brush, a housing having a flat wall portion, a toothed rack having a flange riding on said flat wall portion, a shaft rotatably mounted in the housing, a gear on the shaft, a large gear rotatably mounted in the side of the housing, the large gear normally engaging against and acting as a guide for the rack, a pair of lugs pressed inwardly from the housing and providing a support for the large gear adjacent the rack, the large gear being movable into or out of engagement with said shaft gear and means whereby movement of the rack toward the shaft gear moves the large gear into mesh with the shaft gear and movement of the rack away from the shaft gear moves the large gear out of mesh with the shaft gear, a pinion gear connected to the large gear and meshing with the toothed rack, a trigger pivotally mounted in the housing and turnable on its pivot in either direction to move the rack in either direction and a spring tending to turn the trigger on its pivot in one direction.

3. In a rotary tooth brush, a housing having a flat wall portion, a toothed rack having a flange slidable on said flat wall portion, a cover for the housing having inturned lugs extending in spaced relation with the flat wall portion and over the flange of the toothed rack, a lug on one end of the toothed rack adapted to engage one of the inturned lugs of the cover member to limit movement of the rack in one direction, one end of the rack being provided with a curved end adapted to engage the housing wall to limit movement of the toothed rack in the opposite direction, a trigger pivotally mounted in the housing and adapted upon turning movement on its pivot to move the rack longitudinally on said flat wall portion, a spring resisting turning movement of the trigger in one direction, a shaft and a gear reduction mechanism between the shaft and the toothed rack.

OSCAR A. NETSCHKE.